United States Patent
Otobe et al.

(10) Patent No.: US 9,441,287 B2
(45) Date of Patent: Sep. 13, 2016

(54) NI-CR-CO-BASED ALLOY HAVING HIGH-TEMPERATURE CORROSION RESISTANCE, AND POPPET VALVE SURFACE-MODIFIED WITH THE SAME

(71) Applicants: Fukuda Metal Foil & Powder Co., Ltd., Kyoto-shi, Kyoto (JP); Nittan Value Co., Ltd., Hadano-shi, Kanagawa (JP)

(72) Inventors: Katsunori Otobe, Kyoto (JP); Shinichi Nishimura, Kyoto (JP); Kazunori Kurahashi, Hadano (JP); Yoshihiro Takahashi, Hadano (JP)

(73) Assignees: FUKUDA METAL FOIL & POWDER CO., LTD., Kyoto (JP); NITTAN VALVE CO., LTD., Kanagawa (JP)

(*) Notice: Subject to any disclaimer, the term of this patent is extended or adjusted under 35 U.S.C. 154(b) by 0 days.

(21) Appl. No.: 14/438,959
(22) PCT Filed: Oct. 8, 2013
(86) PCT No.: PCT/JP2013/077308
§ 371 (c)(1),
(2) Date: Apr. 28, 2015
(87) PCT Pub. No.: WO2014/069180
PCT Pub. Date: May 8, 2014

(65) Prior Publication Data
US 2015/0284828 A1 Oct. 8, 2015

(30) Foreign Application Priority Data
Oct. 31, 2012 (JP) .................. 2012-240724

(51) Int. Cl.
*C22C 30/00* (2006.01)
*C22C 19/05* (2006.01)
(Continued)

(52) U.S. Cl.
CPC ............ *C22C 27/06* (2013.01); *C22C 30/00* (2013.01); *F01L 3/04* (2013.01); *F16K 25/005* (2013.01); *F16K 27/00* (2013.01); *F01L 2103/00* (2013.01); *F01L 2820/01* (2013.01)

(58) Field of Classification Search
CPC ...... C22C 19/052; C22C 27/06; C22C 30/00
See application file for complete search history.

(56) References Cited

U.S. PATENT DOCUMENTS

| 4,066,448 | A | 1/1978 | Haeberle, Jr. |
| 5,314,659 | A | 5/1994 | Hidaka et al. |
| 6,579,628 | B2 * | 6/2003 | Takeuchi ............. B23K 35/304 138/142 |

FOREIGN PATENT DOCUMENTS

| JP | 05-271841 A | 10/1993 |
| JP | 07-18365 A | 1/1995 |

(Continued)

OTHER PUBLICATIONS

English Abstract and English Machine Translation of Kimihiko et al. (JP 2003-136279) (May 14, 2003).*

(Continued)

*Primary Examiner* — Jessee Roe
(74) *Attorney, Agent, or Firm* — Westerman, Hattori, Daniels & Adrian, LLP

(57) ABSTRACT

There is provided a surface-coating material having excellent cracking resistance and peeling resistance, and having excellent high-temperature corrosion resistance properties; and a poppet valve coated with the surface-coating material. The Ni—Cr—Co-based alloy comprises 40.0 to 50.0 mass % of Cr, 10.0 to 20.0 mass % of Co, 0.5 to 5.0 mass % of Nb, 0.01 to 5.0 mass % of Fe and 0.1 to 3.0 mass % of Si, with the remainder being 26.0 to 40.0 mass % of Ni and unavoidable impurities. The Ni—Cr—Co-based alloy may additionally comprise one or more elements selected from Mo, W, Mn, Ti, Al, B and C in a total amount of 5.0 mass % or less. The content of each of Ti and Al is 3.0 mass % or less and the content of each of B and C is 1.0 mass % or less. In the poppet valve, at least a face portion is coated with the Ni—Cr—Co-based alloy.

4 Claims, 2 Drawing Sheets

(51) Int. Cl.
*C22C 27/06* (2006.01)
*F01L 3/04* (2006.01)
*F16K 25/00* (2006.01)
*F16K 27/00* (2006.01)

(56) References Cited

FOREIGN PATENT DOCUMENTS

| | | |
|---|---|---|
| JP | 07-41926 A | 2/1995 |
| JP | 07-90619 A | 4/1995 |
| JP | 07-292453 A | 11/1995 |
| JP | 07-305159 A | 11/1995 |
| JP | 09-108888 A | 4/1997 |
| JP | 09-227980 A | 9/1997 |
| JP | 09-316622 A | 12/1997 |
| JP | 10-25578 A | 1/1998 |
| JP | 10-226841 A | 8/1998 |
| JP | 2000-160270 A | 6/2000 |
| JP | 3148340 B2 | 3/2001 |
| JP | 2002-530525 A | 9/2002 |
| JP | 2003-136279 A | 5/2003 |
| JP | 2003-307105 A | 10/2003 |
| JP | 2006-022358 A | 1/2006 |
| JP | 2006-193762 A | 7/2006 |
| JP | 2009-041059 A | 2/2009 |

OTHER PUBLICATIONS

International Search Report dated Dec. 17, 2013, issued in corresponding application No. PCT/JP2013/077308.
International Preliminary Report on Patentability (Form PCT/IPEA/409) of Application No. PCT/JP2013/0077308 dated Apr. 30, 2015 (3 pages).

* cited by examiner

NI-CR-CO-BASED ALLOY HAVING HIGH-TEMPERATURE CORROSION RESISTANCE, AND POPPET VALVE SURFACE-MODIFIED WITH THE SAME

TECHNICAL FIELD

The present invention relates to a material for surface modification that is used in various application processes such as high-speed flame spraying, plasma spraying, PTA powder overlaying, and vapor deposition, particularly to a Ni—Cr—Co-based alloy which has high-temperature corrosion resistance and which is used for members for which high-temperature corrosion resistance is required; and a poppet valve surface-modified with the alloy.

BACKGROUND ART

About poppet valves for which high-temperature corrosion resistance is required, heat-resistant alloys have been generally used for their valve substrate. However, in recent years, used fuels have been deteriorated, or the temperature of combustion gas has been made higher by an increase in the power of engines, so that high-temperature corroding environment becomes severer. Thus, the valves have been becoming short in lifespan. Specifically, face portions of air intake valves and exhaust valves have been required to have higher high-temperature corrosion resistance; however, heat-resistant steels and heat-resistant alloys each have a composition giving priority to mechanical properties at high temperature to be insufficient in chemical properties against high-temperature corrosion and others. Thus, limitations have been imposed onto the matter that a single material satisfies mechanical properties and chemical properties simultaneously. Therefore, in order to solve the problems in the prior art, the following surface modifying techniques have been investigated as a method for making use of mechanical properties of a material while further high-temperature corrosion resistance is given to the material: for example, the spraying of a mixed powder of Ni-50Cr, which is used for coating a power generating boiler or some other, and carbide chromium (Patent Documents 1 and 2); diversion of the spraying (Patent Documents 2 to 7) of a MCrAlY alloy or yttria stabilized zirconia, which is used for coating turbines or others; the spraying of a heat insulating material (ceramic material) for the surface-coating of engine valves (Patent Document 8); and the application of high chromium alloys (Patent Documents 9 to 15).

PRIOR ART DOCUMENTS

Patent Documents

Patent Document 1: JP-A-07-305159
Patent Document 2: JP-A-2009-41059
Patent Document 3: JP-A-09-316622
Patent Document 4: JP-A-2002-530525
Patent Document 5: JP-A-10-25578
Patent Document 6: JP-A-07-90619
Patent Document 7: JP-A-07-292453
Patent Document 8: JP-A-2003-307105
Patent Document 9: JP-A-10-226841
Patent Document 10: JP-A-09-227980
Patent Document 11: Japanese Patent No. 3148340
Patent Document 12: JP-A-2006-22358
Patent Document 13: JP-A-07-18365
Patent Document 14: JP-A-2006-193762
Patent Document 15: JP-A-07-41926

However, about the coating using a ceramic material such as chromium carbide or yttria stabilized zirconia, at the time when a layer based on the coating exfoliates, the ceramic material, which is a hard material, is bitten between a valve and a valve sheet so that the valve or the valve sheet may be unfavorably damaged.

In the high-Cr-based spraying materials disclosed in Patent Documents 9 to 15, a Cr-rich solid solution becomes a matrix so that the resultant coating layer is low in resistance against thermal shock; thus, the coating layer may crack or exfoliate so that the resultant valve may not gain satisfactory durability.

SUMMARY OF THE INVENTION

Problems to be Solved by the Invention

About surface modifying techniques for making engine valves long in lifespan, according to conventional techniques (conventional materials), also in the surface modification of a member for which only high-temperature corrosion resistance is required, hard ceramic materials, such as chromium carbide, or high-Cr-based alloys have been applied or investigated as spraying materials. However, these coating materials are low in toughness although the materials are excellent in high-temperature corrosion resistance. Accordingly, for articles to which intense thermal shock is applied, the resultant coating layer is cracked, and is peeled with the cracking, so that the high-temperature corrosion resistance thereof, which is an original purpose, may not act. Thus, it has been becoming a subject to develop a coating material having cracking resistance and peeling resistance, and further having excellent high-temperature corrosion resistance.

Means for Solving the Problems

In the present invention, at the time of investigating an alloy composition for developing a coating material excellent in high-temperature corrosion resistance, target values described below have been set, and the matter that all of these values are satisfied has been rendered a requirement for the invention.
(Target Values)
(1) Charpy impact value→30 J/cm$^2$ or more;
(2) High-temperature corrosion resistance/vanadium attack→the corrosion weight loss is less than 45.0 mg/cm$^2$;
(3) High-temperature corrosion resistance/sulfurization corrosion→the erosion depth by the corrosion is 20 µm or less;
(4) Thermal shock test of the sprayed coating→4 the coating is neither cracked nor peeled under (a temperature of 600° C.→water cooling); and
(5) Adhesion strength of the sprayed coating: 70 MPa or more.

Thus, the composition of the Ni—Cr—Co-based alloy of the present invention having high-temperature corrosion resistance, which satisfies the above-mentioned targets (1) to (5), is a composition of 40.0 to 50.0 mass % of Cr, 10.0 to 20.0 mass % of Co, 0.5 to 5.0 mass % of Nb, 0.01 to 5.0 mass % of Fe, 0.1 to 3.0 mass % of Si, and the remainder being 26.0 to 40.0 mass % of Ni and unavoidable impurities. The unavoidable impurities are impurities incorporated inevitably in the respective steps of producing individual raw materials of the alloy or other steps although the impurities are each not intended to be added to the raw materials. Examples of the impurities include Mg, Ca, S, O, N, V, Zr and Sn. The total amount of these elements is usually 0.3 mass % or less, and is such a quantity that the effects of the present invention are not affected.

Alternatively, the composition of the Ni—Cr—Co-based alloy which has high-temperature corrosion resistance is a composition of 40.0 to 50.0 mass % of Cr; 10.0 to 20.0 mass % of Co; 0.5 to 5.0 mass % of Nb; 0.01 to 5.0 mass % of Fe; 0.1 to 3.0 mass % of Si; 5.0 mass % or less of one or more elements selected from Mo, W, Mn, Ti, Al, and B, the content of each of Ti and Al being 3.0 mass % or less, and the content of B being 1.0 mass % or less; and the remainder being 26.0 to 40.0 mass % of Ni and unavoidable impurities.

The following will describe reasons why each of the components in the alloy of the present invention is limited in content.

Cr is dissolved in a Ni solid solution to improve the alloy in high-temperature corrosion resistance. However, if the content thereof is less than 40.0 mass %, the high-temperature corrosion resistance is insufficient. If the content is more than 50.0 mass %, a Cr-rich solid solution is produced so that the alloy is largely lowered in thermal shock resistance. Thus, the Cr content is specified into the range of 40.0 to 50.0 mass %.

Co is dissolved in the Ni solid solution to heighten the alloy in toughness and improve the alloy in cracking resistance and peeling resistance. However, if the content thereof is less than 10 mass %, the advantageous effects are small. If the content is more than 20 mass %, a Cr-rich solid solution is newly produced so that the alloy is largely lowered in toughness. Thus, the Co content is specified into the range of 10.0 to 20.0 mass %.

Nb is dissolved in the Ni solid solution to contribute to the strengthening of grain boundaries of the alloy, thereby improving the alloy in high-temperature corrosion resistance. However, if the content thereof is less than 0.5 mass %, the grain boundary strengthening is insufficient. If the content thereof is more than 5.0 mass %, the alloy is largely lowered in toughness. Thus, the Nb content is specified into the range of 0.5 to 5.0 mass %.

When ferro-niobium is used for the addition of Nb at the time of producing any alloy, Fe is inevitably incorporated thereinto in an amount of about 0.01 mass %. Fe does not contribute to properties of the alloy. However, Fe is dissolved in the Ni solid solution. If the content thereof is more than 5 mass %, the alloy is lowered in impact value. Thus, the Fe content is specified into the range of 0.01 to 5.0 mass %.

Si is dissolved in the Ni solid solution to lower the melting point of the alloy material, and further improves the alloy in melt-flowability when the alloy is melted. Thus, Si has an effect of decreasing defects, such as voids, present in the resultant coat in spraying or overlaying. In particular, in spraying application, Si has an effect of decreasing unmelted particles to improve the coating in peeling resistance. However, if the content thereof is less than 0.1 mass %, this effect is not obtained. If the content is more than 3.0 mass %, Si forms silicide so that the alloy is largely lowered in toughness. Thus, the Si content is specified into the range of 0.1 to 3.0 mass %.

The Ni—Cr—Co-based alloy of the present invention having high-temperature corrosion resistance may contain, as additive elements that do not affect physical properties thereof, each of Mo, W and Mn in an amount of 5.0 mass % or less, each of Ti and Al in an amount of 3.0 mass % or less, and B in an amount of 1.0 mass % or less. However, if the content of each of Mo, W, Mn, Ti, Al, B is more than the specified content of the element, or the total amount of these elements is more than 5.0 mass %, an intermetallic compound is produced so that the alloy is lowered in toughness. Thus, the total amount of Mo, W, Mn, Ti, Al, B is specified to 5.0 mass % or less.

Effect of the Invention

The Ni—Cr—Co-based alloy of the present invention has a Charpy impact value of 30 $J/cm^2$ or more to be sufficient in thermal shock resistance, and further has excellent high-temperature corrosion resistance; thus, this alloy is usable as a surface modifying material capable of bearing a severe high-temperature corroding environment. When a powder or a bar of this alloy is applied, for coating, to respective poppet valves of various materials, the valves can be improved in high-temperature corrosion resistance. Furthermore, the alloy is applicable to articles in wide fields other than the valves.

MODE FOR CARRYING OUT THE INVENTION

The alloy of the present invention can be obtained by adjusting and blending Ni as a base, Cr, Co, Nb, Fe and Si as additive components, and other components to be added as required, such as Mo, W, Mn, Ti and Al into predetermined percentages by mass, respectively, heating/melting the resultant parent metal inside a crucible in a melting furnace to be made into a liquid alloy, and then making the liquid alloy into powder by an atomizing method or a melting and pulverizing method, or casting the liquid alloy into a predetermined mold to be made into a bar or plate form.

In particular, the alloy powder produced by the atomizing method is adjusted into a particle size suitable for a target application method, thereby being applicable to spraying, PTA overlaying or some other surface modifying application; an overlaying-applied bar produced by a continuous casting method is applicable to gas overlaying, or some other surface modifying application; and the alloy made into an ingot is used as an evaporation source for a vapor deposition method to be applicable to surface modifying application. A poppet valve that may be made of various materials is coated with this powder or bar so that high-temperature corrosion resistance can be given to the poppet valve.

Figure 1:
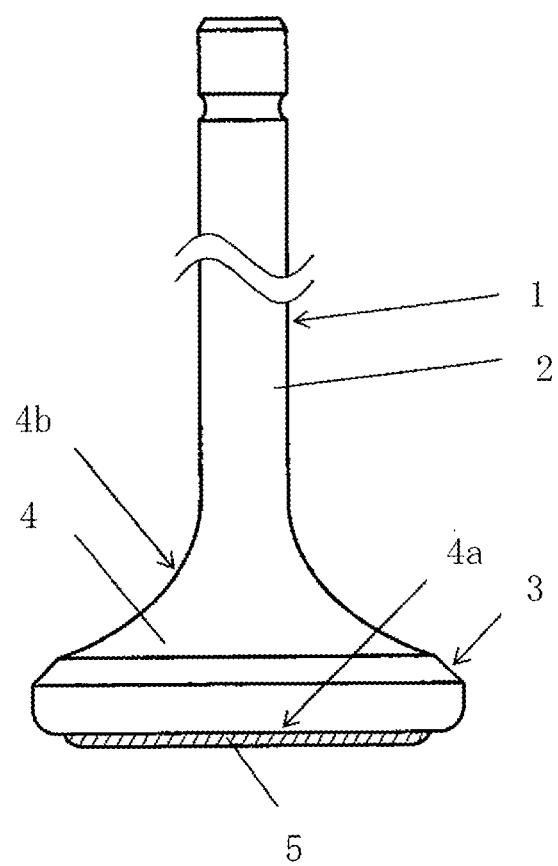
FIG. 1 is a schematic view illustrating an example of a poppet valve in which a face portion is coated with the Ni—Cr—Co-based alloy of the present invention.
Figure 2:
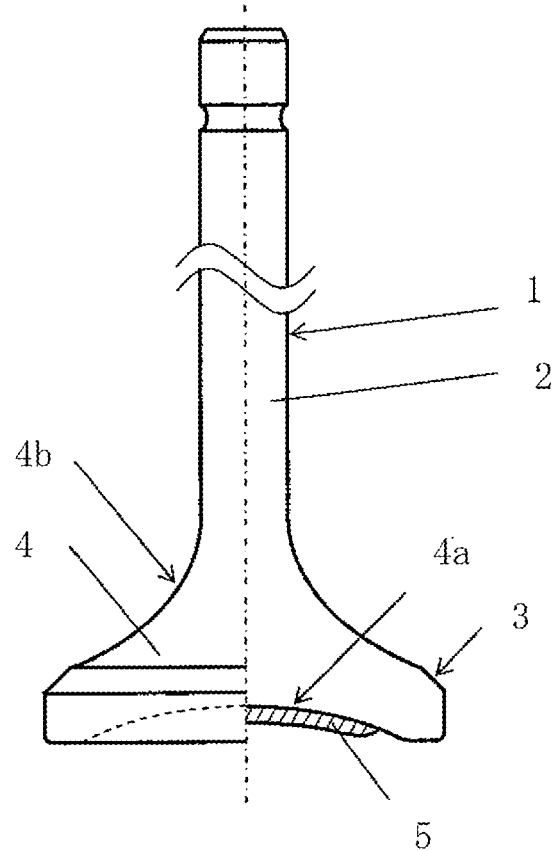
FIG. 2 is a schematic view illustrating an example of a poppet valve different in shape from that in FIG. 1, which is coated with the Ni—Cr—Co-based alloy of the present invention.

FIGS. 1 and 2 are each a schematic view illustrating an example of a poppet valve coated with a Ni—Cr—Co-based alloy of the present invention. In the example, which is a poppet valve 1, a head portion 4 is located at one end side of a stem portion 2. A coating layer 5 formed by coating a face portion 4a of this head portion 4 with the above-mentioned alloy is laid on the face portion 4a. Reference sign 3 represents a seat portion, and reference sign 4b represents a fillet portion. It is sufficient for the poppet valve of the present invention to be a poppet valve having a face portion having at least a surface coated with the coating layer 5 formed by use of the above-mentioned Ni—Cr—Co-based alloy. The present invention is not limited to the poppet valve having the structure illustrated in each of the drawings.

EXAMPLES

Produced were an ingot of an alloy prepared/element-blended as described above according to each example of the present invention, and an ingot of an alloy of each comparative example. In accordance with respective methods described below, the Charpy impact value of each of the examples was measured, and a high-temperature corrosion test thereof was made. Each alloy powder produced by an atomizing method was used to evaluate properties of a coat obtained by subjecting the powder to spraying application.

(1) Charpy impact test: An electric furnace was used to heat and melt 100 g of a parent metal having each of the above-mentioned alloy compositions to about 1600° C. in an argon gas flow. The resultant was cast into a shell mold. In this way, the melted ingot was mechanically worked into a specimen (without any notch) described in JIS Z 2242: 2005. A Charpy impact tester was used to make an impact test of the specimen in accordance with JIS Z 2242: 2005 to measure the impact value.

About any alloy having a Cr proportion of more than 60 mass % in Patent Documents 9 to 15, the alloy failed in being melted in an electric furnace, the temperature of which was set to about 1600° C. Thus, comparison of the present invention therewith was given up (patents compared with the present invention were only those of Patent Documents 11 and 15).

(2) High-temperature corrosion test (vanadium attack test): Each cast pieces through the same ingot-producing process as described in the item (1) was mechanically worked into the form of a column 12 mm in diameter×3 mm. In this way, each specimen was produced. Moreover, the "weight of the specimen before the test" was measured. A mixed reagent made of a powder obtained by grinding 85 mass % of $V_2O_5$ and 15 mass % of $Na_2SO_4$ in a mortar was applied to the entire surface of this specimen to make a corrosion test of the specimen in accordance with a method in JIS Z 2292: 2004. The specimen was heated and kept in an atmospheric furnace of 800° C. for 20 hours, and then washed with an alkali to remove scales therefrom. The "weight of the specimen after the test" was then measured.

[Corrosion weight loss $(mg/cm^2)$]={(weight of the specimen before the test)−(weight of the specimen after the test)}÷(surface area of the specimen). This equation was used to analyze the corrosion weight loss. A decision criterion described below was set up, and any one of the specimens to which a decision A or B was given was judged to be acceptable.

Decision A: the corrosion weight loss is less than 22.5 $mg/cm^2$.

Decision B: the corrosion weight loss is 22.5 $mg/cm^2$ or more, and is less than 45.0 $mg/cm^2$.

Decision C: the corrosion weight loss is 45.0 $mg/cm^2$ or more.

(3) High-temperature corrosion test (sulfurization corrosion test): Each specimen was produced in the same way as in the item (2), and a mixed reagent made of a powder obtained by grinding 90 mass % of $Na_2SO_4$ and 10 mass % of NaCl in a mortar was applied to the entire surface of this specimen to make a corrosion test of the specimen in accordance with a method in JIS Z 2292: 2004. The specimen was heated and kept in an atmospheric furnace of 800° C. for 20 hours, and then cooled and washed with an alkali to remove scales therefrom. The specimen was cut, and any one of the cut surfaces was polished. The state of the cross section thereof was observed. About the cross section state, a decision criterion described below was set up, and any one of the specimens to which a decision represented by a circular mark was given was judged to be acceptable.

Decision represented by a circular mark: the erosion depth is 20 μm or less.

Decision represented by a cross mark: the erosion depth is more than 20 μm.

(4) Thermal shock test: A high-frequency melting furnace was used to heat and melt 100 kg of a parent metal having each of the above-mentioned alloy compositions to about 1600° C. in an argon gas flow, and then made into a powder by a gas atomizing method. A shaking machine was used to adjust the particle size of the powder into the range of 10 to 45 μm. By high-speed flame spraying, this alloy powder was sprayed into a film thickness of about 200 μm onto a face portion of a poppet valve made of Fe—Ni—Cr-based heat-resistant steel and subjected to blasting. The stem portion of the powder-sprayed poppet valve was cut away, and only the head portion was used as a specimen. The specimen was put into an atmospheric furnace containing an atmosphere of a predetermined temperature, kept therein for 1 hour, and cooled with water. It was checked by liquid penetrant inspection and in accordance with the external appearance state whether the sprayed coating was cracked or not, and the coating was peeled or not. The temperature for the test was raised from 300° C. at intervals of 100° C. A test was continued until the sprayed coating was cracked and peeled. In accordance with the respective temperatures at which the sprayed coating was cracked and peeled, a decision criterion described below was set up. Any one of the specimens to which a decision represented by a circular mark was given was judged to be acceptable.

Decision represented by a circular mark: the sprayed coating was neither cracked nor peeled at a test temperature of 600° C. or higher.

Decision represented by a cross mark: the sprayed coating was cracked and peeled at a test temperature of 500° C. or lower.

(5) Adhesion strength test of sprayed coating: Each alloy powder was produced by the same method as in the item (4). By high-speed flame spraying, the powder was sprayed onto a single side of a specimen described in JIS K 6849:1994 (round-bar adhesion tensile strength specimen). A tensile tester was used to make a tensile test of the specimen in accordance with JIS K 6849: 1994 to measure the adhesion strength of the sprayed coating. A decision criterion described below was set up, and any one of the specimens to which a decision represented by a circular mark was given was judged to be acceptable.

Decision represented by a circular mark: 70 MPa or more.

Decision represented by a cross mark: less than 70 MPa.

Table 1 shows examples of the present invention while Table 2 shows comparative examples.

TABLE 1

| Example No. | Ni | Cr | Co | Nb | Fe | Si | Mo | W | Mn | Ti | Al | B | C | Impact value (J/cm$^2$) | High-temperature corrosion resistance Vanadium attack | High-temperature sulfide attack | Thermal shock test | Adhesion strength of sprayed coating |
|---|---|---|---|---|---|---|---|---|---|---|---|---|---|---|---|---|---|---|
| 1 | 36.0 | 45.0 | 15.0 | 2.0 | 1.5 | 0.5 | — | — | — | — | — | — | — | 80 | A | ○ | ○ | ○ |
| 2 | 35.9 | 41.0 | 18.5 | 1.3 | 0.3 | 1.0 | — | 2.0 | — | — | — | — | — | 58 | B | ○ | ○ | ○ |
| 3 | 26.8 | 49.0 | 16.0 | 0.6 | 4.0 | 2.6 | 0.8 | — | — | 0.2 | — | — | — | 32 | A | ○ | ○ | ○ |
| 4 | 32.7 | 47.0 | 11.0 | 1.0 | 4.5 | 1.1 | — | — | — | — | 2.5 | 0.2 | — | 44 | A | ○ | ○ | ○ |
| 5 | 32.7 | 42.5 | 14.0 | 4.5 | 3.0 | 0.3 | — | — | 3.0 | — | — | — | — | 32 | B | ○ | ○ | ○ |
| 6 | 36.2 | 42.0 | 15.0 | 3.3 | 2.0 | 0.7 | — | — | — | — | — | 0.8 | — | 38 | B | ○ | ○ | ○ |
| 7 | 33.8 | 45.0 | 17.0 | 1.8 | 1.2 | 0.4 | — | — | — | — | 0.5 | — | 0.3 | 48 | A | ○ | ○ | ○ |
| 8 | 39.3 | 41.5 | 12.5 | 0.8 | 0.5 | 0.8 | 2.8 | — | 1.6 | 0.2 | — | — | — | 33 | B | ○ | ○ | ○ |

TABLE 2

| Comp. Ex. No. | Ni | Cr | Co | Nb | Fe | Si | Mo | W | Mn | Ti | Al | B | C | Impact value (J/cm$^2$) | High-temperature corrosion resistance Vanadium attack | High-temperature sulfide attack | Thermal shock test | Adhesion strength of sprayed coating |
|---|---|---|---|---|---|---|---|---|---|---|---|---|---|---|---|---|---|---|
| A | 38.8 | 37.0 | 12.0 | 1.8 | 3.0 | 3.5 | — | 1.8 | — | — | 1.5 | — | 0.6 | 22 | C | X | X | ○ |
| B | 24.1 | 52.0 | 16.0 | 2.5 | 4.0 | 1.2 | — | — | — | — | — | 0.2 | — | 5 | A | ○ | X | X |
| C | 40.8 | 45.0 | 8.0 | 2.7 | 2.0 | 0.3 | — | — | — | — | — | — | 1.2 | 9 | B | ○ | X | X |
| D | 25.0 | 42.0 | 22.0 | 1.5 | 2.0 | 1.0 | 2.0 | 4.0 | — | 0.5 | — | — | — | 18 | B | ○ | X | ○ |
| E | 32.3 | 44.0 | 16.0 | 0.2 | 3.0 | 2.5 | — | — | 1.5 | — | 0.5 | — | — | 36 | C | X | ○ | ○ |
| F | 25.1 | 48.0 | 14.0 | 5.5 | 6.0 | 1.2 | — | — | — | — | 0.2 | — | — | 4 | A | ○ | X | X |
| G | 45.0 | 53.0 | — | — | — | — | 2.0 | — | — | — | — | — | — | 58 | A | X | ○ | ○ |
| H | 42.5 | 51.2 | — | 3.8 | — | — | 2.5 | — | — | — | — | — | — | 13 | A | ○ | X | ○ |
| I | 40.0 | 41.5 | 10.0 | — | 5.0 | — | 1.5 | 2.0 | — | — | — | — | — | 150 or more | C | X | ○ | ○ |
| J | 37.5 | 56.0 | — | — | — | 3.0 | — | 2.5 | — | — | — | — | 1.0 | 2 | B | X | X | X |

Comparative example alloys (A) to (F) shown in Table 2 each have a composition outside of the scope of the claims for the present invention. About alloy (A), the Cr content is less than the lower limit of that in the claims, and the Si content is more than the upper limit of that in the claims. About alloy (B), the Cr content is more than the upper limit of that in the claims, and further the Ni content is less than the lower limit of that in the claims. About alloy (C), the Co content is less than the lower limit of that in the claims, and further the content of Ni is more than the upper limit of that in the claims. About alloy (D), the total amount of Mo, W and Ti, as well as the Co content, are more than the upper limits of those in the claims, and further the Ni content is less than the lower limit of that in the claims. About alloy (E), the Nb content is less than the lower limit of that in the claims. About alloy (F), the content of each of Nb and Fe is more than the upper limit of that in the claims, and further the Ni content is less than the lower limit of that in the claims. Each of the alloys other than alloy (E) does not satisfy the target value about the Charpy impact value. Alloys (A) and (E) do not satisfy the target about the high-temperature corrosion resistance. The alloys which do not satisfy the target about the impact value do not satisfy the respective targets about the thermal shock property of their sprayed coating, or the adhesion strength of the sprayed coating.

Comparative example alloys (G) to (J) shown in Table 2 each have a composition described in the other patent documents. These alloys are each not an alloy satisfying all the targets about the Charpy impact value, the high-temperature corrosion resistance, the thermal shock test and the adhesion strength.

By contrast, as shown in Table 1, Examples 1 to 8, which are alloys of the present invention, satisfy the target value about each of the Charpy impact value, the high-temperature corrosion resistance, the thermal shock test and the adhesion strength. Thus, these alloys can each be expected to be usable as a coating material against any environment that may cause severe high-temperature corrosion.

INDUSTRIAL APPLICABILITY

As described above, the Ni—Cr—Co-based alloy according to the present invention has high-temperature corrosion resistance excellent for a surface modifying material. Thus, it can be expected that by surface-coating various members with the alloy of the present invention, these members are remarkably improved in corrosion resistance. The Ni—Cr—Co-based alloy of the present invention has high toughness so that the coating layer is also excellent in peeling resistance. Accordingly, by coating a poppet valve that may be made of various materials, particularly, with a powder or a bar of the alloy, the poppet valve can be improved in high-temperature corrosion resistance. The alloy can be applied to wider fields different from the field of poppet valves.

The alloy of the present invention can be used for forming a mechanical member excellent in high-temperature corrosion resistance by not only spraying, overlaying or vapor deposition but also powder metallurgy or casting.

DESCRIPTION OF REFERENCE SIGNS

1: poppet valve
2: stem portion
3: seat portion
4: head portion
4a: face portion
4b: fillet portion
5: coating layer

The invention claimed is:

1. A poppet valve, which is subjected to surface modification through any application process selected from spraying, overlaying, and vapor deposition, using a Ni—Cr—Co-based alloy having high-temperature corrosion resistance and having a composition of:
   40.0 to 50.0 mass % of Cr;
   10.0 to 20.0 mass % of Co;
   0.5 to 5.0 mass % of Nb;
   0.01 to 5.0 mass % of Fe;
   0.1 to 3.0 mass % of Si; and
   the remainder being 26.0 to 40.0 mass % of Ni and unavoidable impurities.

2. The poppet valve according to claim 1, wherein the surface modification is applied to at least a face portion.

3. A poppet valve, which is subjected to surface modification through any application process selected from spraying, overlaying, and vapor deposition, using a Ni—Cr—Co-based alloy having high-temperature corrosion resistance and having a composition of:
   40.0 to 50.0 mass % of Cr;
   10.0 to 20.0 mass % of Co;
   0.5 to 5.0 mass % of Nb;
   0.01 to 5.0 mass % of Fe;
   0.1 to 3.0 mass % of Si;
   one or more elements selected from Mo, W, Mn, Ti, Al and B in a total amount of 5.0 mass % or less, the content of each of Ti and Al being 3.0 mass % or less, and the content of B being 1.0 mass % or less; and
   the remainder being 26.0 to 40.0 mass % of Ni and unavoidable impurities.

4. The poppet valve according to claim 3, wherein the surface modification is applied to at least a face portion.

* * * * *

UNITED STATES PATENT AND TRADEMARK OFFICE
CERTIFICATE OF CORRECTION

PATENT NO. : 9,441,287 B2  
APPLICATION NO. : 14/438959  
DATED : September 13, 2016  
INVENTOR(S) : Otobe et al.

Page 1 of 1

It is certified that error appears in the above-identified patent and that said Letters Patent is hereby corrected as shown below:

On the Title Page

Item (71), delete: "Fukuda Metal Foil & Powder Co.,Ltd., Kyoto (JP); Nittan "Value" Co., Ltd., Hadano-shi, Kanagawa (JP)"

Insert: --Fukuda Metal Foil & Powder Co., Ltd., Kyoto (JP); Nittan --Valve-- Co., Ltd., Hadano-shi, Kanagawa (JP)--

Signed and Sealed this  
Twentieth Day of June, 2017

Joseph Matal  
*Performing the Functions and Duties of the*  
*Under Secretary of Commerce for Intellectual Property and*  
*Director of the United States Patent and Trademark Office*